Dec. 6, 1955          C W. MUSSER          2,726,055
CATAPULT FOR AIRCRAFT PERSONNEL AND OTHER USES
Filed July 15, 1953
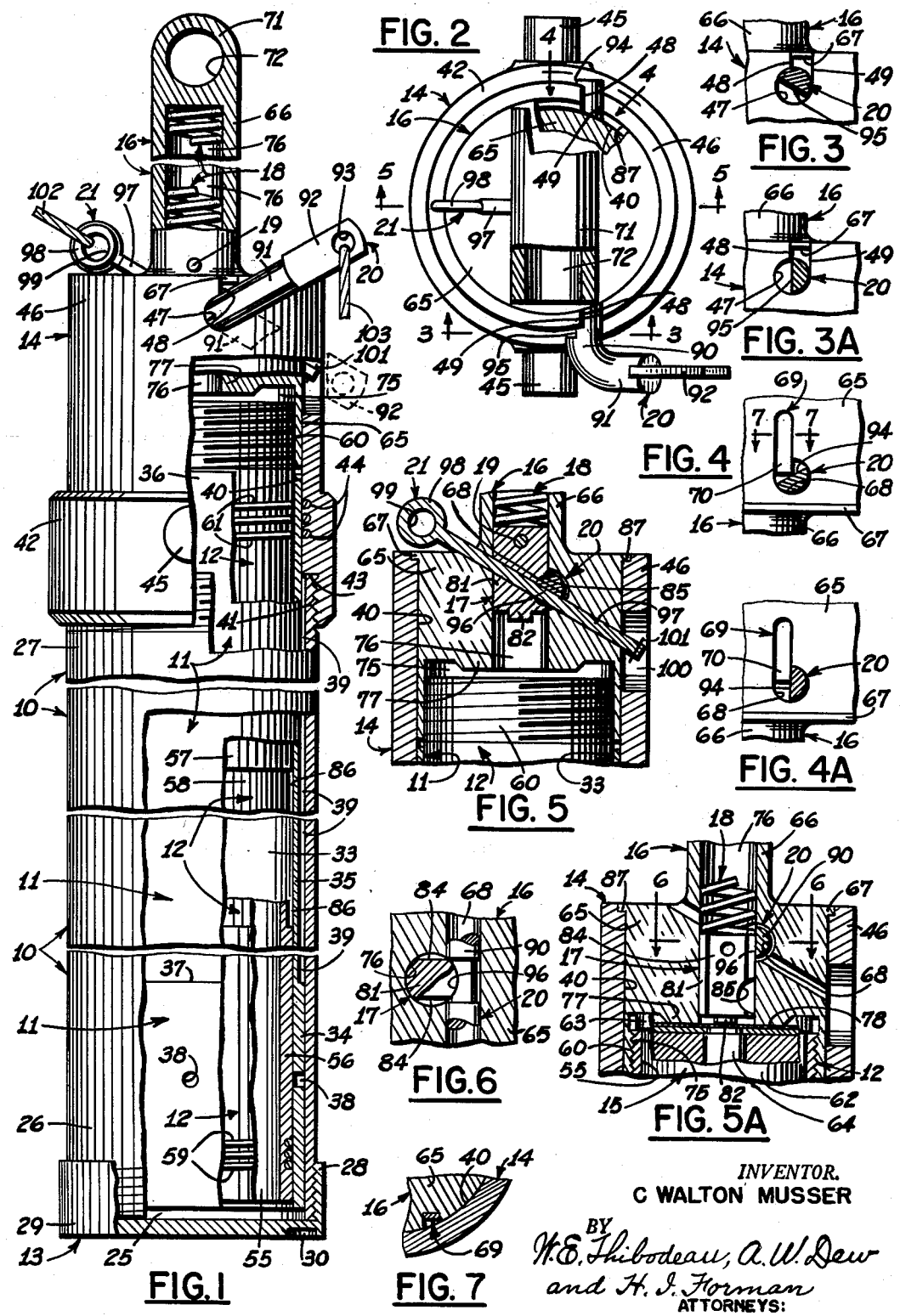
INVENTOR.
C WALTON MUSSER
BY
W. E. Thibodeau, A. W. Dew
and H. J. Forman
ATTORNEYS

United States Patent Office 2,726,055
Patented Dec. 6, 1955

2,726,055

CATAPULT FOR AIRCRAFT PERSONNEL AND OTHER USES

C Walton Musser, Philadelphia, Pa., assignor to the United States of America as represented by the Secretary of the Army Application July 15, 1953, Serial No. 368,244

11 Claims. (Cl. 244—122)

(Granted under Title 35, U. S. Code (1952), sec. 266)

The invention described herein may be manufactured and used by or for the Government for governmental purposes without the payment of any royalty thereon.

My invention relates, broadly, to catapults. Although not limited solely thereto, it has particular reference to catapults for forcibly ejecting personnel from aircraft moving at high velocity when, in time of emergency, it becomes necessary for such personnel to leave the aircraft in flight and to parachute down to earth.

Those skilled in the art know that until the development of high speed aircraft capable of speeds of four hundred miles per hour and more, it was not difficult for a person to exit from an airplane in flight in time of emergency by his own, unaided efforts, then to return to earth by parachute. In those days the forces acting on a person to impede his exit from an airplane were not great enough to prevent the flyer from overcoming them by his own muscular strength; nor was the force of the air slip stream on him, when once out of the airplane, great enough to carry him back against and cause a collision with the airplane.

With the advent of high speed aircraft, however, emergency exit of personnel during flight could no longer be effected in the manner practiced heretofore. The main reason for this was that the action of speed generated forces, many times the force of gravity, became so great as to make it exceedingly difficult, if not impossible, for the flyer to move himself out of the airplane by his own strength. Additionally, should the flyer succeed somehow in freeing himself from the airplane, the force of the air slip stream was so great as to carry him into collision with the airplane, thereby causing him serious, sometimes fatal, personal injury.

For these and other reasons it became necessary to equip aircraft capable of high speeds with some means to provide for forcibly ejecting personnel therefrom when emergency exit became necessary during flight. The use of such means made exit from the plane possible without the necessity for the expenditure of any great amount of muscular energy. This has been accomplished in a manner which projects the seat, together with the occupant thereof, from the airplane with sufficient force and rapidity so as to eliminate the possibility of collision with the after structure of the airplane. Following ejection, the flyer separates himself from the seat, waits a few seconds for the seat to fall far enough away from him, then resorts to his parachute to return to earth.

One typical means provided for ejecting personnel from aircraft is exemplified in my U. S. Patent No. 2,516,902, "Telescopic Gun for Aircraft Personnel Catapult and Other Uses," issued August 1, 1950. As will become evident later, my present invention is an improvement over that typical catapult. Although being somewhat similar thereto in general construction, installation, and operation, the new catapult will be shown to include inventive features not heretofore known to the art. These features include a novel sear member which permits improved construction; and a means for equalizing internal pressures which permits the catapult to be made of lighter, thinner walled internal tubes and to operate in a greatly improved manner.

One object of my invention is to simplify the design and construction of catapults for forcibly ejecting personnel from aircraft moving through space at high velocity.

Another object is to provide a telescope-like catapult which does not require auxiliary means, additional to the catapult, for preventing accidental, axial movement of the catapult's members during normal inversion of the airplane in flight.

A further object is to provide a catapult whose axially moving members are not subject to radial distortion from gas pressure existing within the catapult.

A still further object is to provide a catapult in which operation of the means for activating the catapult first releases the means preventing axial movement of the catapult's members.

Yet another object is to improve the mode of operation of telescope-like catapults.

The foregoing and other objects and advantages of my invention will become apparent from an inspection of the following description and the accompanying drawings which describe and show, respectively, one embodiment of my invention. It must be realized, however, that my invention may exist in forms other than that herein shown and described.

For simplicity of drawing, only the catapult is shown; no airplane or other airplane part is illustrated. One preferred manner of attaching the illustrative catapult to the seat is explained and illustrated in my aforementioned U. S. Patent No. 2,516,902.

In the drawings:

Fig. 1 is a partly broken away and partly sectioned side view of my improved catapult shown prior to being mounted in the airplane and prior to being connected to the seat therein. In this figure, the catapult's sear is shown in its "standby" position (i. e., the position prior to activation of the catapult) by solid line; and is indicated to be in its "active" position (i. e., the position incidental to firing) by broken line.

Fig. 2 is a partly broken away and partly sectioned plan view of the Fig. 1 catapult from which the lanyards shown in Fig. 1 have been removed.

Fig. 3 is a portion of a side view taken along line 3—3 of Fig. 2 and showing the locking relationship existing between the catapult's sear and trunnion ring when the sear is in the standby position shown in solid line in Fig. 1.

Fig. 3A is similar to Fig. 3, but showing the unlocked relationship between the sear and the trunnion ring when the sear is in the active position indicated in broken line in Fig. 1.

Fig. 4 is a portion of a side view taken along line 4—4 of Fig. 2, after removal of the overlying portion of the trunnion ring, showing the relationship between a stop bar positioned in the catapult's upper cap and the sear when that sear is in the standby position. It is pointed out that, because of the direction from which this view is taken (see line 4—4 of Fig. 2), this figure appears upside down when compared with Figs. 3 and 3A.

Fig. 4A is similar to Fig. 4 but shows the relationship between the stop bar and the sear when the sear is in the active position.

Fig. 5 is a portion of a vertical cross-section taken along line 5—5 of Fig. 2 showing, primarily, the correlation existing between the catapult's safety pin, locking pin, firing pin and sear when the sear is in the standby position. For conveniece of drawing, the catapult's explosive cartridge has not been included.

Fig. 5A is similar to Fig. 5 but, compared to that figure, shows the action which takes place when the sear is moved to the active position after withdrawal of the safety pin and the locking pin. In this figure a portion of the catapult's explosive cartridge is shown partly broken away and partly sectioned.

Fig. 6 is a horizontal cross-section taken along line 6—6 of Fig. 5A and showing additional details of the firing pin and of the sear.

Fig. 7 is a horizontal cross-section taken along line 7—7 of Fig. 4 and showing additional details of the catapult's stop bar. In this figure, the portion of the trunnion ring removed from Fig. 4 has been included.

From the standpoint of basic structure, my catapult comprises the outer tube 10 (see Fig. 1), the intermediate tube 11 (see Figs. 1 and 5), and the inner tube 12 (see Figs. 1, 5 and 5A). Associated with outer tube 10 are the lower cap 13 (see Fig. 1) and the trunnion ring 14 (see Figs. 1 to 3A, 5, 5A, and 7); and associated with inner tube 12 are the explosive cartridge 15 (see Fig. 5A) and the upper cap 16 (see Figs. 1 to 7). Located in the upper cap are the firing pin 17 (see Figs. 5, 5A and 6), the firing pin spring 18 (see Figs. 1, 5, and 5A), the safety pin 19 (see Figs. 1 and 5), the sear 20 (see Figs. 1 to 6), and the locking pin 21 (see Figs. 1, 2 and 5).

In order to facilitate the understanding of my invention and appreciation of its uniqueness, the essential features of the several components thereof follow. For fluency of description, the components will be described in the likely order of assembly.

Outer tube and lower cap

Outer tube 10 has the cylindrical bore 25 and is externally threaded at its lower and upper ends 26 and 27 (i. e., toward the bottom and top of the drawing sheet) respectively (see Fig. 1).

Lower cap 13 is a cup-like member and is provided with the internally threaded, open end 28 and with the closed end 29, also see Fig. 1. This cap is sealingly attached to the outer tube's lower end 26 to completely close off that end of the outer tube from the outside atmosphere. Attachment of the lower cap is facilitated by the use of a spanner wrench (not shown) which fits into recesses 30, one of which is shown in Fig. 1, located on the cap's closed end. After the lower cap is attached to the outer tube, the cap may be secured in place in any convenient manner as by staking (not shown).

Intermediate tube

Intermediate tube 11 is a hollow, cylindrical member having the susbtantially constant diametered bore 33 (see Fig. 1). The external surface of this tube is provided with the skirt portion 34 at its lower end, and with the somewhat smaller diametered portion 35 which extends upward through the remainder of the tube's length to the upper end 36 (see Fig. 1). Skirt portion 34 is slightly less in diameter than the outer tube's bore 25. The difference in diameter between the intermediate tube's skirt portion 34 and smaller diametered portion 35 results in the formation therebetween of the shoulder 37 (also see Fig. 1). As also shown in that figure, skirt portion 34 is provided with a plurality of bleeder openings 38, two of which are shown. These openings pass through the intermediate tube's wall to provide a means of passage between the exterior and the interior of that tube.

The intermediate tube fits concentrically within outer tube 10 (see Fig. 1) in which it is slidably supported by virtue of a bearing, but not a sealing, relationship existing between the outer tube's bore 25 and the intermediate tube's skirt portion 34. It can also be seen, in Fig. 1, that the intermediate tube is somewhat longer than the outer tube so that the intermediate tube's upper end 36 extends somewhat beyond the outer tube's upper end 27. Further, as also shown in Fig. 1, the intermediate tube's smaller diametered portion 35 stands away from the outer tube's bore 25 to create the annular space 39 therebetween.

After the intermediate tube is positioned within the outer tube, trunnion ring 14 is threadably attached to the outer tube's upper end 27 (see Fig. 1). The essential details of the trunnion ring follow.

Trunnion ring

Trunnion ring 14 is a hollow, tubular member having the cylindrical bore 40 (see Figs. 1, 2, 5, 5A and 7). This bore is slightly larger in diameter than the intermediate tube's smaller diametered portion 35, and is provided with the internally threaded recess 41 concentric thereto (see Fig. 1). As there shown, this recess extends upwardly part way from the lower end 42 of the trunnion ring and is somewhat larger in diameter than bore 40 so that the annular shoulder 43 exists therebetween. Also provided in bore 40, somewhat above shoulder 43, is the helical sealing member 44 (see Fig. 1). In Figs. 1 and 2 it can be seen that the trunnion ring's lower end 42 is provided with the diametrically opposed, radially extending lugs 45 (only one being partially shown in the former figure) which later serve for mounting the catapult in the airplane.

Located in the trunnion ring's wall near the upper end 46, at opposite ends of an imaginary chordal line passing rather close to the ring's longitudinal axis, are the circular openings 47, one of which is shown in Figs. 1, 3 and 3A. Also located in the trunnion ring's wall relative to the same imaginary chordal line and extending axially upward from each circular opening to the trunnion ring's upper end is the passageway having the short side 48 and the long side 49 parallel thereto (see Figs. 2 to 3A). Each passageway is formed by the removal of the trunnion ring's wall between the short and long sides and extends parallel to the trunnion ring's axis. As shown in Figs. 1 to 3A, short side 48 is closer to the trunnion ring's axis than long side 49; and, as shown in Figs. 3 and 3A, short side 48 is approximately directly above the circular opening's center, while long side 49 is substantially tangent to the circular opening. The significance of these circular openings and passageways will become apparent later when the operation of my catapult is explained.

As earlier mentioned, trunnion ring 14 is attached to the outer tube's upper, threaded end 27 (see Fig. 1) after intermediate tube 11 is positioned within the outer tube. The trunnion ring and the outer tube are joined so that a sealing relationship exists between the trunnion ring's shoulder 43 and the outer tube's upper end 27. After joining the trunnion ring can be secured to the outer tube in any convenient manner as by staking (not shown).

When in position upon outer tube 10 (see Fig. 1) the trunnion ring's bore 40 has a bearing, but not a sealing relationship, with the intermediate tube's smaller diametered portion 35. However, the trunnion ring's helical sealing member 44 acts to seal the space between those parts. Notice, in Fig. 1, that the trunnion ring's bore 40 is somewhat less in diameter than the outer tube's bore 25 so that the ring's annular shoulder 43 overlaps the outer tube's bore 25.

Having positioned intermediate tube 11 within outer tube 10, and having attached trunnion ring 14 to the outer tube, the essential details of inner tube 12 and explosive cartridge 13 follow.

Inner tube and explosive cartridge

Inner tube 12 has the substantially constant diametered bore 55 (see Fig. 1) and is characterized, externally, by the lower bearing portion 56, the substantially identically diametered upper bearing portion 57, and by the somewhat smaller diametered intermediate portion 58 (also see Fig. 1). Lower bearing portion 56 is provided with the helical sealing member 59 (see Fig. 1), and upper bearing portion 57 is provided with the threaded end 60 (see Figs. 1, 5 and 5A) and with the helical sealing member 61 (see Fig. 1).

Explosive cartridge 15 consists of a cylindrical body portion 62 and the somewhat larger diametered head portion 63 (see Fig. 5A). The internal construction of this cartridge, as well as its subsequent operation, does not form part of the particular invention herein disclosed, so extensive description of the cartridge is unnecessary. It will suffice to say that the cartridge shown (see Fig. 5A) is of the percussion type and is detonatable by sufficient impact against the hammer 64 contained therein (see Fig. 5A). As shown in that figure, the explosive cartridge's body portion 62 fits within inner tube 12, and the cartridge's head portion 63 abuts that tube's upper end 60 thereby limiting insertion of the cartridge within the inside tube. Explosive cartridge 15 is secured in place by means of the upper cap 16 which will now be described.

Upper cap

Upper cap 16 comprises the cylindrical body portion 65 (see Figs. 1, 2 and 4 to 7) from the central portion of whose upper surface the shank 66 projects upwardly (see Figs. 1 and 3 to 5A).

Body portion 65, whose external diameter is substantially the same dimension as the exterior of intermediate tube 11, is provided at its upper end with the flange 67 (see Figs. 1 and 3 to 5A). Passing through the body portion, near its upper end, is the cylindrical opening 68 (see Figs. 4 and 4A). This opening is formed on an imaginary chordal line which, when the upper cap is later assembled to trunnion ring 14, is continuous with the chordal line upon which the trunnion ring's circular openings 47 are formed. Positioned on the body portion's lateral surface at one end of cylindrical opening 68 is the stop bar 69 (see Figs. 4, 4A and 7). This bar has the flat end 70 (see Figs. 4 and 4A) and is so located relative to opening 68 that the bar's flat end covers part of that opening. After positioning, the bar is secured in place in any convenient manner, as by peening (not shown).

Shank portion 66 is provided at its upper end with the horizontally extending bar portion 71 (see Fig. 2) through which the opening 72 (see Figs. 1 and 2) extends substantially parallel to cylindrical opening 68. It will be shown later that bar portion 71 provides for attachment of my catapult to the seat to be ejected from the airplane.

Internally, upper cap 16 is provided with the axial, threaded recess 75 which extends part way into body portion 65 from its lower end (see Figs. 1 and 5) and with the axial blind recess 76 which extends upwardly from the end of recess 75 into shank 66 for an appreciable distance (see Fig. 1).

Axially located in recess 75 is the boss 77 (see Figs. 1, 5 and 5A), which is so shaped and dimensioned conveniently to support closing disc 78, forming part of explosive cartridge 15, at later assembly of the upper cap to inner tube 12.

Slidably accommodated in the upper cap's blind recess 76 is firing pin 17. This pin has the cylindrical body portion 81 (see Figs. 5, 5A and 6) from the lower end of which the firing tip 82 projects downwardly (see Figs. 5 and 5A). Firing pin 17 is constantly urged toward the blind recess' open end by means of spring 18 whose upper end bears against the recess' closed end (see Fig. 1) and whose lower end bears against the top of the firing pin's body (see Figs. 5 and 5A).

In order to facilitate movement of the firing pin in blind recess 76, the pin's body is provided with the axially extending flats 84 (see Figs. 5A and 6). During the pin's movement, these surfaces permit equalization of air pressure at each end of the firing pin thereby preventing, especially at the time of firing, air from being trapped between the firing pin and explosive cartridge 15, and from interfering with the firing pin's movement. Formed in the side of body portion 81, just near its lower end and extending perpendicularly between the flats 84, is the arcuate groove 85 (see Fig. 5A). More will be said about this groove later in connection with sear 20.

After the firing pin is placed inside recess 76, the pin is pushed sufficiently far into that recess thereby compressing spring 18, so as to impart the desired amount of potential energy to the spring. When in the proper position, the firing pin is restrained in place by means of safety pin 19 (see Figs. 1 and 5) which passes through an accommodating opening in the upper cap's shank portion 66 and in the firing pin. When the firing pin is in this position, which I shall call the "retracted" position, the pin's arcuate groove 85 becomes concentric with the upper cap's cylindrical opening 68 (see Fig. 5).

The firing pin is capable of assuming one of two positions: The "retracted" position, earlier mentioned (see Fig. 5), in which it is placed when the catapult is assembled during manufacture; and the "active" position, also earlier named (see Fig. 5A), which it assumes under influence of spring 18 as a result of operation of the catapult later to be described.

After explosive cartridge 15 is positioned in inner tube 12, upper cap 16 is threadedly joined to the inner tube's upper, threaded end 60. The cartridge's head portion 63 is accommodated in the upper cap's recess 75 and is firmly seated, by the upper cap, against the inner tube's upper end 27 to form a sealing relationship therewith. In addition, the cap's central boss 77 lightly abuts the cartridge's closing disc 78 to prevent that disc from being dislodged where the cartridge is fired.

After upper cap 16 is attached to inner tube 12, the inner tube is inserted, lower bearing portion 56 foremost, into the intermediate tube's upper end 36. Notice, in Fig. 1, that the annular space 86 is formed between the inner tube's intermediate portion 58 and the intermediate tube's bore 33. Insertion of the inner tube is continued until the upper cap's flange 67 becomes seated in the accommodating recess 87 provided in trunnion ring 14 (see Figs. 5 and 5A). As an external indication that the catapult contains explosive cartridge 15, a wire (not shown) may be looped through a convenient opennig (also not shown) provided in trunnion ring 14 and upper cap 16.

In order to hold upper cap 16 in trunnion ring 14, and therefore, in consequence, to prevent intermediate tube 11 from moving axially out the trunnion ring's upper end 46, and also to prevent inner tube 12 from moving axially out the intermediate tube's upper end 36, sear 20 is inserted into one of the trunnion ring's circular openings 47, through the upper cap's coaxial, cylindrical opening 68, and out through the trunnion ring's other circular opening as indicated in Fig. 2. The essential details of the sear follow.

Sear

Sear 20 is a cylindrical member which has been formed into the illustrated L shape so as to have the long leg 90 (see Figs. 2 and 6) and the short leg 91 (see Figs. 1 and 2). As shown in the last-named figures, the short leg's free end 92 is flattened and is provided with the opening 93. Long leg 90 is provided, at its free end, with the flat 94 (see Figs. 2, 4 and 4A); and, at its opposite extremity, with the flat bottomed groove 95, part of which is shown in plan view in Fig. 2 and in section in Figs. 3 and 3A. Flat 94 and the bottom of groove 95 are coplanar as viewed from the direction indicated by line 3—3 of Fig. 2. Therefore, with reference to Figs. 3 and 3A, flat 94 has the same position relative to its passageway comprising short and long sides 48 and 49, respectively, as the flat bottomed groove 95 has to its passageway. Long leg 90 is also provided, near its central portion, with the arcuate groove 96 (see Figs. 5, 5A and 6) which has a radius slightly greater than the radius of firing pin 17 (see Fig. 6).

After the sear is inserted into the trunnion ring and the upper cap as previously described, the sear's flat bottomed groove 95 straddles the portion of the trunnion ring's wall adjacent thereto (see Fig. 2), the sear's long leg 90 mates with the firing pin's arcuate groove 85 (see Fig.

5), and the sear's flat 94 straddles the portion of the trunnion ring's wall adjacent that flat (also see Fig. 2).

Also after insertion into trunnion ring 14 and upper cap 16, sear 20 is rotated to the standby position in which the sear's short leg 91 assumes the position shown, in heavy line, in Fig. 1. When the sear is in this position (also see Figs. 2, 3, 4, and 5) it serves two purposes: first it interlocks with trunnion ring 14 (see Fig. 3), thereby preventing upper cap 16, in which it is housed, from moving axially out the trunnion ring's upper end 46; second, it also interlocks with firing pin 17 (see Fig. 5) thereby preventing movement of that pin to the firing position. Having the upper cap restrained against axial movement relative to the trunnion ring, in turn, prevents intermediate tube 11 from moving axially out the trunnion ring's upper end, and also prevents inner tube 12, which is attached to the upper cap, from moving axially out the intermediate tube's upper end 36. In other words, the catapult's tubular members are held in a telescoped relationship to each other.

As earlier mentioned, sear 20 is also rotatable in upper cap 16 to the "active" position (i. e., the position to which the sear is moved in order to activate the catapult) shown in Figs. 1 (in broken line), 3A, 4A, 5A, and 6. As the sear is moved to the active position two events occur. First, the interlocking relationship between the sear and trunnion ring 14 is released (see Fig. 3A) thereby enabling the upper cap to move axially out of the trunnion ring's upper end 46, and therefore enabling intermediate tube 11 to move axially out of the trunnion ring's upper end as well as enabling inner tube 12, attached to the upper cap, to move axially out the intermediate tube's upper end 36. Second, the interlocking relationship between the sear and the firing pin 17 is released (see Fig. 6) allowing the firing pin, assuming previous removal of the safety pin, to move under influence of spring 18 to the firing position to act on explosive cartridge 15 (see Fig. 5A).

By comparing Fig. 4, which shows the relationship existing between the upper cap's stop bar 69 and the sear's flat 94 when the sear is in the standby position, with Fig. 4A, which shows the relationship existing between the stop bar and the flat when the sear is moved to the active position, it is apparent that stop bar 69 prevents movement of the sear past the active position.

The interlocking, dual purpose feature of the sear is one of the inventive characteristics of my improved catapult. This feature is unique in that no other means, auxiliary to the catapult, are required for the purpose of holding the catapult's tubular members in the telescoped relationship as the airplane is rolled over or banked in flight.

It is apparent from the previous discussion that sear 20 is rotated to this active position only when it is desired to actuate the catapult. Therefore, in order to prevent accidental movement of the sear to that position, locking pin 21 is inserted into the catapult at assembly. Details of the locking pin follow.

*Locking pin*

Locking pin 21 consists of the cylindrical shank portion 97 and the flattened head portion 98 (see Figs. 1, 2 and 5). The head portion is provided with the opening 99 (see Figs. 1 and 3).

As earlier mentioned, the locking pin is inserted into the catapult after the sub-assembled inner tube 12, explosive cartridge 15 and upper cap 16 are joined to the previously assembled intermediate tube 11, outer tube 10, lower cap 13 and trunnion ring 14, and, further, after sear 20 has been inserted into the trunnion ring and the upper cap and has been rotated to the standby position shown in Figs. 1 (in solid line), 2, 3, 4, and 5. As shown in Fig. 5, the locking pin's shank 97 passes through a continuous accommodating opening in the upper cap and firing pin 17 and projects into the opening 100 conveniently located in the trunnion ring's wall (also see Fig. 1). In extending through the upper cap and the firing pin, the locking pin interengages with the sear's arcuate groove 96 (see Fig. 5). To prevent accidental extraction of the locking pin from the catapult, the retaining wire 101 (see Figs. 1 and 5) is passed through the shank portion's free end.

From Fig. 5, it is apparent that locking pin 21 can be inserted through upper cap 16 only when firing pin 17 is in the retracted position, and only when sear 20 is in the standby position. With the locking pin in place, three purposes are served: first, by interlocking with the sear's arcuate groove 96 (see Fig. 5) movement of the sear to the active position is prevented; second, also by virtue of the interlocking relationship with the sear's arcuate groove, the sear cannot be pulled out of upper cap 16; third, by passing through firing pin 17 (also see Fig. 5) movement of the firing pin to the active position is prevented.

*Mounting the catapult into the airplane*

After complete assembly, my catapult is mounted in the airplane (not shown) through the agency of the trunnion ring's lugs 45, and is attached to the airplane's slidably removable seat through the agency of the upper cap's bar portion 71. The manner of mounting the catapult in the airplane, and of attaching it to the seat therein may be similar to that shown and described in my aforementioned U. S. Patent 2,516,902. For that reason such attachment is not illustrated in the drawings accompanying the present disclosure.

After my catapult is mounted in the airplane and is attached to the seat therein, one end of the lanyard, or like member, 102 (see Fig. 1) is secured in any convenient manner to locking pin 21 through the pin's opening 99, one end of another lanyard, or like member, 103 (also see Fig. 1), is secured in any convenient manner to sear 20 through the sear's opening 93, and safety pin 19 is extracted from the catapult leaving the firing pin's movement to the active position blocked by the locking pin and by the sear.

In usual fashion, the opposite end of lanyard 102 is secured in convenient manner to the airplane's canopy (not shown) which, as is well known, removably covers the opening in the airplane's fuselage through which the seat is to be ejected. In similar fashion, the opposite end of the other lanyard 103 is attached to means (not shown) operable by the seat's occupant to exert a downward pull on the sear's short leg 91 to cause rotation of the sear from its standby to its active position. This action causes the catapult to become operative to forcibly eject the seat, and the person therein, from the airplane in flight. The operation of my catapult will now be described.

*Operation*

The operation of the catapult can be considered as comprising two phases: the first phase constitutes necessary preliminary steps to be taken prior to the catapult's operation in effecting forcible ejection of the seat from the airplane; the second phase constitutes actual forcible ejection of the seat, and the person therein, from the airplane.

The first phase of the catapult's operation is, in essence, a sequence of mechanical movements comprising removal of locking pin 21, rotation of sear 20 from the standby position to the active position, forceful movement of firing pin 17 from the retracted position to the firing position, and detonation of explosive cartridge 15. This first phase may be accomplished manually or automatically (neither shown) according to preference. As will subsequently be shown, completion of the first phase automatically results in initiation of the second phase.

The second phase, likewise, is a sequence of mechanical movements comprising limited axial movement of intermediate tube 11 out of the trunnion ring's upper end 46 until that movement is arrested by trunnion ring 14, and mechanically unlimited axial movement of inner tube 12 and attached upper cap 16 completely out of the intermediate tube's upper end 36. This second phase ensues as a result of the action of gas pressure generated by detonation of explosive cartridge 15. Because, as earlier mentioned, the airplane's seat (not shown) is connected to inner tube 12 through the agency of upper cap 16, completion of the second phase results in forcible ejection of the seat, and the occupant thereof, from the airplane (not shown).

Removal of locking pin 21, which is the first step to be taken in the operation of my catapult, after removal of safety pin 19 at installation of the catapult, is accomplished in the following manner. The airplane's canopy (not shown) is moved by well-known means (also not shown) out of the path along which the airplane's seat will later be ejected. As the canopy is moved, sufficient pull is exerted on lanyard 102 and locking pin 21 to shear retaining wire 101 off the locking pin and to extract the locking pin from firing pin 17. In consequence of the extraction of the locking pin, the only obstacle remaining to prevent movement of firing pin 17 to the firing position, is sear 20 which, at present, remains in the standby position. Also, in consequence of the extraction of the locking pin, sear 20 can be rotated to the active position.

Rotation of sear 20 from the standby position to the active position, after removal of locking pin 21, is accomplished by operation of other well-known means (not shown) which exert sufficient pull on the sear's short leg 91 to rotate the sear's long leg 90 about the latter leg's axis. As the sear is thus rotated two events occur: first, the sear's flat 94 and the coplanar bottom of groove 95 become aligned with the trunnion ring's respective passageways, each of which comprises the earlier-named short and long sides 48 and 49 respectively (see Fig. 3A which depicts the alignment of the bottom of groove 95 with one passageway); second, the sear's arcuate groove 96 moves from the position shown in Fig. 5 to that shown in Figs. 5A and 6 and thereby becomes aligned with the lateral surface of firing pin 17 (see Figs. 5A and 6).

As a consequence of this movement, sear 20 is unlocked from trunnion ring 14 so that upper cap 16 carrying the sear can now move axially from the trunnion ring's upper end 46, and inner tube 12 attached to the upper cap can move axially from the intermediate tube's upper end 36. Also in consequence of this movement, intermediate tube 11 can now move axially from the trunnion ring's upper end 46 until the intermediate tube's shoulder 37 abuts the trunnion ring's shoulder 43.

As a second consequence of the sear's movement to the active position, the last barrier preventing movement of firing pin 17 from the retracted position shown in Fig. 5 to the firing position shown in Fig. 5A is removed, and the firing pin is therefore free to move under force imparted by spring 18 against explosive cartridge 15 to cause its detonation.

Forceful movement of firing pin 17 from the retracted position to the firing position takes place as soon as sear 20 has been rotated sufficiently far to bring its arcuate groove 96 into parallelism with the firing pin's axis (see Figs. 5A and 6). This movement, as earlier mentioned, is caused by spring 18 which acts upon the firing pin to move it energetically against explosive cartridge 15.

Detonation of explosive cartridge 15 results from the impact of firing pin 17 against the cartridge's closing disc 78. This impact is transmitted to the cartridge's hammer 64 which, in turn, is moved sufficiently to explode a percussion primer (not shown) contained within the explosive cartridge. In usual manner, fire from the primer is directed to the cartridge's main powder charge (also not not shown) which is thereby ignited. Ignition of this main powder charge produces a large quantity of gas of combustion which initiates the sequence of events comprising the second phase of the catapult's operation. As in the typical catapult, earlier mentioned, it is from the pressure generated by this volume of gas that the seat attached to inner tube 12 is forcibly ejected from the airplane. However, the particular mode of operation has been improved in the new catapult.

After ignition of the explosive cartridge's main charge, the second phase of the catapult's operation is accomplished practically instantaneously. In order to include all aspects of the catapult's performance, the sequence of events, based on well-known scientific principles, will be described one at a time so that the action will seem to be in slow motion.

Substantially coincident with ignition of explosive cartridge 15, the free end (not shown) of the cartridge's casing material is blown open by the gas resulting from ignition of the cartridge's powder charge (not shown). This gas, ever increasing in volume, flows out the cartridge's rent casing, fills all available space inside the catapult, and proceeds to build up enough pressure therein to cause intermediate tube 11 to move its full amount axially from the trunnion ring's upper end 46, then to cause inner tube 12, with the seat attached thereto, through upper cap 16 to be projected from the intermediate tube's upper end 36 into space.

Before discussing the axial movement of those tubes, however, explanation of how, after bursting of the cartridge's casing, the gas pressure builds up within the catapult in consequence of the intermediate tube's bleeder openings 38 will be made.

Referring to Fig. 1, no gas can escape between lower cap 13 and outer tube 10 because of the sealing relationship existing between those parts. The gas is also prevented from passing through the space between the intermediate tube's bore 33 and the inner tube's lower bearing portion 56 by the inner tube's helical sealing member 59, but some of the gas does pass through the space between the intermediate tube's skirt portion 34 and the outer tube's bore 25 into annular space 39 between the intermediate tube's smaller diametered portion 35 and the outer tube's bore. However, because this space is effectively closed by the sealing relationship existing between the outer tube's upper end 27 and trunnion ring 14, and also by the similar relationship existing between the intermediate tube's smaller diametered portion 35 and the trunnion ring's sealing member 44, the gas is thus retained within annular space 39. Some of the gas also passes through the space between the intermediate tube's skirt portion 34 and the outer tube's bore 25, passes through the intermediate tube's bleeder openings 38, through the space between the inner tube's lower bearing portion 56 and the intermediate tube's bore 33 into annular space 86 between the inner tube's intermediate portion 58 and the intermediate tube's bore. This space is effectively sealed, at one end, by the relationship existing between the inner tube's upper sealing member 61 and the intermediate tube's bore and, at the opposite end, by the similar relationship, earlier mentioned, existing between the inner tube's lower sealing member 59 and the intermediate tube's bore. Thus, gas resulting from ignition of explosive cartridge 15 has access to space 86, but, for the present, is prevented from leaking out of the catapult.

From this explanation it can be seen that, because of the intermediate tube's bleeder openings 38, the unit pressure (i. e., pressure per unit of surface area) on the interior and exterior wall surfaces of both the intermediate tube and inner tube is equalized. Consequently, radially acting stresses on those members tending to cause distortion are effectively counteracted. This is another novel characteristic of my invention. As a result of this feature, the walls of the intermediate and inner tubes can be substantially thinner than those heretofore used, and the operation of the catapult is greatly improved because the tendency, present in prior art devices, of the tubular members to bind against each other during the second phase of the catapult's operation is eliminated.

Following the initial equalization of gas pressure inside the catapult before any axial movement of the inner and intermediate tubes, 12 and 11 respectively, relative to outer tube 10 occurs, the gas pressure inside the catapult continues to increase. In doing so, pressure acts on intermediate tube 11 to move that tube a small amount away from lower cap 13 until the tube's upper end 36 abuts the lower end of the upper cap's body portion 65. With continued increase of pressure, the intermediate and inner tubes move in unison axially out the trunnion ring's upper end 46. In view of prior art, this movement of those tubes is not shown. Because the load (i. e., the total weight of the airplane's seat, the occupant thereof, and his gear) is directly associated with inner tube 12 through upper cap 16, there is no relative axial movement, at this time, between inner and intermediate tubes 12 and 11, respectively.

As the intermediate tube moves out the trunnion ring's upper end, the volume of annular space 39 decreases, while the pressure therein increases, but the volume of annular space 86 remains constant. In order to maintain equal gas pressures on the interior and exterior surfaces of both the inner and intermediate tube's walls, and to prevent any pressure increase in annular space 39 from offering undue impedance to the intermediate tube's movement by acting on that tube's shoulder 37, there is a compensating flow of gas between the outer tube's bore 25 and the intermediate tube's skirt portion 34, through the intermediate tube's bleeder opening 38, between the inner tube's lower bearing portion 56 and the intermediate tube's bore 33 into annular space 86. There is also a compensating flow between the intermediate tube's skirt portion and the outer tube's bore into the outer tube's bore and into the inner tube's bore 55. Thus pressure equalization is maintained.

Intermediate tube 11 and inner tube 12 continue their axial movement in unison out the trunnion ring's upper end until the intermediate tube's shoulder 37 abuts the trunnion ring's shoulder 43 which extends between the bores 40 and 25 of the trunnion ring and the outer tube 14 and 10, respectively. At that time no further axial movement of the intermediate tube relative to the trunnion ring is possible, but the pressure still acts to maintain this relationship between these parts.

Since the gas pressure inside the catapult cannot now cause any further axial movement of the intermediate tube relative to the trunnion ring, the still increasing pressure inside the catapult now commences to move inner tube 12 axially out the intermediate tube's upper end 36. Because, as earlier mentioned, the inner tube is directly associated with the load, this tube was, until now, prevented from moving axially relative to intermediate tube 11.

Therefore, with gas pressure acting against upper cap 16 and the end surface of the inner tube's lower bearing portion 56, that tube moves axially out intermediate tube 11. Until the inner tube's lower sealing member 59 passes the intermediate tube's bleeder openings 38, and until the inner tube's upper sealing member 61 leaves the intermediate tube's upper end 36, there can be equalization of gas pressure on the interior and exterior surfaces of both the inner and the intermediate tubes as previously explained. After the inner tube's lower sealing member 59 passes the intermediate tube's bleeder openings, however, no further equalization of gas pressure and stresses is necessary.

The gas pressure continues to move the inner tube farther and farther out of intermediate tube 11. As this action progresses, the inner tube's upper sealing member 61 leaves the intermediate tube's bore 33; however, the inner tube's lower sealing member 59 still preserves its sealing relationship with the intermediate tube's bore to prevent escape of gas from the catapult. Still later, the inner tube's upper bearing portion 57 leaves the intermediate tube's bore 33 leaving the inner tube supported in the intermediate tube by the lower bearing portion 57.

Inner tube 12 finally leaves intermediate tube 11 which remains in the airplane along with outer tube 10 and, with the seat attached thereto, together with the seat's occupant, the inner tube moves into space away from the airplane. Thus, by means of my improved catapult, the seat and the occupant therein are ejected from the airplane. This is done with sufficient acceleration and velocity to overcome the action of speed generated forces tending to prohibit such movement, and with sufficient acceleration and velocity to carry the seat and its occupant a safe distance from the airplane without the possibility of collision with the airplane's after structure. In addition, the action of my catapult produces an ejecting force which is more tolerable to the seat's occupant.

When sufficiently far from the airplane, the person in the seat loosens his safety belt, then easily separates himself from the seat. When there is enough distance between the two to avoid the possibility of interference with the parachute's operation, the person operates means to open the parachute by which he returns to earth.

It will be apparent from the foregoing that I have simplified the design and construction of catapults for forcibly ejecting personnel from aircraft moving through space at high velocity; that I have provided a telescope-like catapult which does not require auxiliary means, additional to the catapult, for preventing accidental movement of the catapult's members during normal inversion of the airplane in flight; that I have provided a catapult whose axially moving members are not subject to radial distortion from gas pressure existing within the catapult; that I have provided a catapult in which operation of means for activating the catapult first releases the means preventing axial movement of the catapult's members; and that I have improved the mode of operation of telescope-like catapults.

Those skilled in the art will realize that my invention is amenable to numerous modifications and variations without departing from its original spirit and scope. Because my invention is so amenable to modifications and variations, I do not wish to be limited in patent coverage to the narrow confines inherent in the illustrative embodiment here disclosed, but rather, only by the metes and bounds of the appended claims.

I claim:

1. A motive power device for aircraft personnel catapults, said device including in combination with a seat structure normally mounted on said aircraft: a plurality of gas-tight, axially slidable, concentric gun-like tubes each of which has a portion which is in bearing relationship to the other; support means for securing the outermost of said tubes to the aircraft's fuselage; connecting means attaching the innermost of said tubes to the seat structure; an explosive charge contained within the space enclosed by said gun-like tubes and arranged to furnish a force for propelling the innermost tube and attached seat structure out of the aircraft; and a sear interconnected with the outermost and innermost tubes so as selectively in one position to lockingly prevent axial movement of the remaining tubes relative to the outermost tube, and in another position to release the tubes so that the remaining tubes can be moved axially with respect to the outermost tube.

2. The device of claim 1 also comprising a firing pin for detonating the explosive charge, said sear additionally being interconnected with the firing pin so that when the sear is in its tube locking position it also locks the firing pin against movement toward the explosive charge, but when the sear releases the tubes it also unlocks the firing pin.

3. The device of claim 2 additionally comprising spring means for constantly urging the firing pin into its explosive charge-detonating position, and a removable safety pin which extends through an opening in said firing pin into lateral contact with a part of the sear and into an opening in the outermost tube's wall, whereby selectively to prevent accidental movement of the sear into firing pin-releasing position and to prevent accidental movement of the firing pin into explosive-charge detonating position in the event that the sear was missing or otherwise failed to lock the firing pin against accidental movement.

4. In a fluid operated, gun-like motive power device, an outer tube having a closed end, an intermediate tube slidably mounted in said outer tube and having a bleeder opening through the wall thereof, said opening being disposed adjacent to that end of said intermediate tube which is proximal to said outer tube's closed end and providing a passage interconnecting the interior of said device with the space between said intermediate and said outer tubes at all times regardless of the relative positions of those tubes, and an inner tube having an open end and a closed end, said inner tube being slidably mounted open end foremost in said intermediate tube with said inner tube's closed end extending from said device for attachment to an object to be propelled by the device.

5. In a fluid operated, gun-like motive power device, the combination of at least three concentric tubes of which the outermost has a closed end and the innermost has a closed end opposite to the closed end of the outermost, and a tube intermediate the outermost and innermost has at least one bleeder opening therethrough, said opening being disposed adjacent to that end of said intermediate tube which is proximal to said outer tube's closed end and providing a passage interconnecting the interior of said device with the space between said intermediate and said outer tubes at all times regardless of the relative positions of those tubes, whereby fluid pressure set up in the device can be equalized rapidly on both the inner and outer surfaces of the tube having such an opening.

6. Apparatus for forcibly ejecting an article from a moving body into space, comprising: a first hollow member closed at one end and mounted in the moving body with an opposing open end directed toward an opening in the moving body through which the article is to be forcibly ejected; a second hollow member also open at one end but having an opposite closed end adapted for attachment to the article, said second hollow member slidably fitting open end foremost inside said first hollow member; an explosive cartridge in said second hollow member for supplying enough energy to forcibly eject the article from the moving body; firing means in said second hollow member's closed end for selectively acting on said explosive cartridge to cause release of its energy; and a sear transfixing said second hollow member and interlocking with said first hollow member to prevent said second hollow member's removal therefrom, and also interlocking with said firing means to prevent its action on said explosive cartridge when in a first position, but said sear being selectively movable to a second position during which the interlocking relationship with said first hollow member is released and then the interlocking relationship with said firing means next is released so as to permit the firing means to act on said explosive cartridge, whereupon said explosive cartridge's energy is released and said second hollow member and the article attached thereto are forcibly ejected from said first hollow member's open end through the opening in the moving body into space.

7. In a catapult for forcibly ejecting an article from a moving body into space, the combination of a first tubular member closed at one end and adapted for mounting in the moving body with an opposing open end facing an opening in the moving body through which the article is to be forcibly ejected; a second tubular member also open at one end, but having an opposite closed end, said second tubular member having a reduced diametered portion intermediate its ends and also having a bleeder opening through its sidewall between that member's reduced diametered portion and its open end, said second tubular member slidably fitting open end foremost inside said first tubular member; a first sealing means adjacent said second tubular member's closed end for preventing the passage of gases in the space between that tube's exterior surface and said first tubular member's interior surface; a second sealing means also on said second tubular member intermediate that tube's open end and its bleeder opening for likewise sealing the space between the exterior and interior surfaces of the same tubes; an explosive cartridge in said second tubular member for supplying sufficient energy to forcibly eject the article from the moving body; firing means in said second tubular member's closed end for selectively acting on said explosive cartridge to cause release of its energy; and a sear through said second tubular member's closed end and through said first tubular member's open end so as to interlock with said first tubular member to prevent said second tubular member's axial movement therefrom, and also to interlock with said firing means to prevent its action on said explosive cartridge when in a first position, but said sear being selectively movable to a second position, during which the interlocking relationship with said first tubular member is released and then the interlocking relationship with said firing means next is released to allow said firing means' action on said explosive cartridge, whereupon said explosive cartridge's energy is released and said second tubular member is moved axially from said first tubular member's open end and, with the article attached, is forcibly ejected from the moving body through the opening therein into space.

8. The combination, in a catapult for forcibly ejecting an article from an airborne object, of an outer tube closed at one end and mounted in the airborne object with an opposing open end directed toward an opening in the airborne object through which the article is to be forcibly ejected; an inner tube having a reduced diametered portion intermediate its ends and also having a plurality of bleeder openings through its wall intermediate that tube's reduced diametered portion and one end, said inner tube slidably fitting, bleeder opening end foremost, inside said outer tube; a first helical sealing member on said inner tube's exterior surface near one end for preventing the passage of gases in the space between that tube's exterior surface and said outer tube's interior surface; a second helical sealing member also on said inner tube's exterior surface near the other end between that tube's end and its bleeder openings; an explosive cartridge for supplying sufficient energy to forcibly eject the article from the airborne object, said explosive cartridge being seated against said inner tube's end farthest from the bleeder openings; a cap on said inner tube for closing the end in which said explosive cartridge is located, part of said cap being slidably accommodated in said outer tube's open end and being movable axially therefrom along with said inner tube, and part of said cap extending outside said outer tube and being adapted for connection to the article to be ejected; firing means in said cap for selectively acting on said explosive cartridge to cause release of its energy; and a sear extending through said cap and through said outer tube's open end so as to interlock with said outer tube to prevent said cap and attached said inner tube from moving axially therefrom, and also to interlock with said firing means to prevent its action on said explosive cartridge when in a first position, but said sear being movable to a second position during which the interlocking relationship with said outer tube is released, so as to make possible first the axial movement therefrom of said cap and the attached said inner tube, and then the release of the interlocking relationship with said firing means to allow said firing means' action on said explosive cartridge, whereupon the cartridge's energy is released and said cap and cojoined said inner tube, with the attached article, are forcibly ejected from the airborne object through the opening therein.

9. The catapult of claim 8 plus a safety pin through the cap and the firing means for preventing the firing means from acting on the explosive cartridge, said safety pin being selectively removable to allow such action; and a locking pin also through the cap and through the firing means and interengaging with the sear for preventing action of the firing means on the explosive cartridge and for preventing movement of the sear to the second position, said locking pin also being selectively removable to allow such actions, whereby, following removal of said safety pin and said locking pin, and rotation of the sear to the second position, the catapult becomes operative to effect forcible ejection.

10. In a telescope-like catapult for forcibly ejecting a person from an airplane through an opening therein at time of emergency, the combination of: a first tubular member closed at one end and mounted in the airplane with an opposing open end directed toward an opening in the airplane through which ejection is to take place, the bore of said member being of somewhat less diameter adjacent its open end than it is for the remainder of the distance to its closed end so as to form a first annular radially projecting shoulder facing the closed end; a second tubular member having a skirt portion at one end and a smaller diametered portion for the remainder of the tube's length so that a second annular radially projecting shoulder exists therebetween, the skirt portion having a bleeder opening therethrough, said second tubular member slidably fitting within said first tubular member with the former tubular member's skirt portion toward said first tubular member's closed end and with said second tubular member's smaller diametered portion slidably supported by the smaller diametered portion of said first tubular member's bore so that said second tubular member is movable axially a limited amount out of said first tubular member's open end until said second annular shoulder abuts said first annular shoulder; a third tubular member having one end closed but open at the opposite end, and having a reduced diametered portion intermediate its ends, said third tubular member being adapted for attachment at its closed end to the seat in which the person sits in the airplane, said third tubular member slidably fitting open end foremost within said second tubular member and being movable therefrom; sealing members for preventing the passage of gases in the spaces between the first and second tubular members, and between the second and third tubular members, respectively; an explosive cartridge in said third tubular member; firing means in said third tubular member's closed end for acting on said explosive cartridge; and a sear rotatably accommodated in said third tubular member's closed end and interengaging with said firing means, said sear also extending through that tube's closed end into interengagement with said first tubular member and being selectively rotatable from a first position in which it prevents said third tubular member from moving axially from said first tubular member and said firing means is prevented from acting on said explosive cartridge, to a second position during which first the interengagement between said sear and said first tubular member is released and then the interengagement between said sear and said firing means is released.

11. The combination, in a telescope-like catapult for forcibly ejecting an article from an airborne object, of: a first tube closed at one end but open at the opposite end; a second tube having a skirt portion at one end and a smaller diametered portion for the remainder of the tube's length so that a first annular radially projecting shoulder exists therebetween, the skirt portion having a bleeder opening therethrough, said second tube slidably fitting, skirt portion foremost, within said first tube and being movable axially through that tube's open end; a trunnion ring attached in leakproof relationship to said first tube's open end and having a bore smaller in diameter than said first tube's bore so that a second annular radially projecting shoulder exists therebetween facing said second tube's annular radially projecting shoulder and so that said trunnion ring slidably supports said second tube's smaller diametered portion allowing that tube to be movable axially from said first tube until the first and the second shoulders abut each other; a third tube having a reduced diametered portion intermediate its ends, said third tube slidably fitting within said second tube and being movable axially therefrom; sealing means for preventing the passage of gases in the spaces between the trunnion ring and the second tube's smaller diametered portion, and between the second and third tubes, respectively; an explosive cartridge carried within said third tube; a cap closing said third tube's end and contacting said explosive cartridge so as to hold said cartridge in place, part of said cap being slidably accommodated in said trunnion ring to be movable axially therefrom along with said third tube, and part of said cap extending outside said trunnion ring for connection to the article to be forcibly ejected; firing means in said cap for acting on said explosive cartridge; and a sear rotatably accommodated in said cap for interengagement with said firing means and extending through said cap into interengagement with said trunnion ring, said sear being selectively rotatable from a first position, in which said cap is prevented from moving axially from said trunnion ring and said firing means is prevented from acting on said explosive cartridge, to a second position, during which the interengagement between said sear and said trunnion ring is released first and next the interengagement between said sear and said firing means is released.

References Cited in the file of this patent

UNITED STATES PATENTS

| 1,802,649 | Heinkel | Apr. 28, 1931 |
| 2,467,763 | Martin | Apr. 19, 1949 |
| 2,516,902 | Musser | Aug. 1, 1950 |
| 2,664,786 | Guisasola | Jan. 5, 1954 |